(12) United States Patent
Ou et al.

(10) Patent No.: US 11,417,331 B2
(45) Date of Patent: Aug. 16, 2022

(54) METHOD AND DEVICE FOR CONTROLLING TERMINAL, AND COMPUTER READABLE STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventors: Zhicai Ou, Guangdong (CN); Weiying Li, Cupertino, CA (US)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 187 days.

(21) Appl. No.: 16/811,102

(22) Filed: Mar. 6, 2020

(65) Prior Publication Data
US 2020/0211557 A1 Jul. 2, 2020

Related U.S. Application Data

(63) Continuation of application No. PCT/CN2017/104103, filed on Sep. 28, 2017.

(30) Foreign Application Priority Data

Sep. 18, 2017 (CN) .......................... 201710846785.8

(51) Int. Cl.
*G10L 15/22* (2006.01)
*G05B 15/02* (2006.01)
(Continued)

(52) U.S. Cl.
CPC .............. *G10L 15/22* (2013.01); *G05B 15/02* (2013.01); *G06F 3/017* (2013.01); *G10L 15/08* (2013.01);
(Continued)

(58) Field of Classification Search
CPC .............. G10L 15/08; G10L 2015/088; G10L 15/00–15/34; G10L 15/22;
(Continued)

(56) References Cited

U.S. PATENT DOCUMENTS 10,459,687 B2 * 10/2019 Ulaganathan ........... G10L 15/07
10,937,419 B2 *  3/2021 Fleurence .............. B60K 35/00
(Continued)

FOREIGN PATENT DOCUMENTS

CN      102306051 A      1/2012
CN      102760432 A     10/2012
(Continued)

OTHER PUBLICATIONS

International Search Report and Written Opinion dated May 22, 2018 received in International Patent Application No. PCT/CN2017/104103 together with an English language translation.
(Continued)

*Primary Examiner* — Abul K Azad
(74) *Attorney, Agent, or Firm* — Scully Scott Murphy & Presser

(57) ABSTRACT

The present disclosure provides a method for controlling a terminal, including the following operations: obtaining recognition results corresponding to control signals after receiving the control signals, and determining whether control instructions corresponding to the recognition results conflict, each control signal comprising at least one of a voice signal or a gesture signal; determining a credibility of each control instruction in response to a determination that
(Continued)

obtaining recognition results corresponding to control signals after receiving the control signals, and determining whether control instructions corresponding to the recognition results conflict, each control signal including at least one of a voice signal or a gesture signal — S10 determining a credibility of each control instruction in response to a determination that there exists conflict among control instructions — S20 sending the control instruction with highest credibility to a control terminal — S30 there exists conflict among control instructions; and sending the control instruction with highest credibility to a control terminal. The present disclosure further provides a device for controlling a terminal and a computer readable storage medium. When control instructions are received and there exists conflict among control instructions, the control instruction with the highest credibility is sent to the control terminal after the credibility of each control instructions is determined, thereby avoiding settings from conflict.

9 Claims, 7 Drawing Sheets

(51) Int. Cl.
*G06F 3/01* (2006.01)
*G10L 15/08* (2006.01)

(52) U.S. Cl.
CPC .. *G10L 2015/088* (2013.01); *G10L 2015/223* (2013.01)

(58) Field of Classification Search
CPC ........ G10L 2015/223; G10L 2015/227; G05B 15/02; G05B 19/418; G06F 3/017; G06F 3/167
See application file for complete search history.

(56) References Cited

U.S. PATENT DOCUMENTS

| | | | | |
|---|---|---|---|---|
| 2011/0313768 | A1* | 12/2011 | Klein | ...................... G06F 3/038 704/251 |
| 2012/0239396 | A1* | 9/2012 | Johnston | ................ H04N 21/47 704/235 |
| 2015/0309561 | A1* | 10/2015 | Stewart | ..................... G06F 3/01 345/156 |

FOREIGN PATENT DOCUMENTS

| | | | |
|---|---|---|---|
| CN | 103885585 | A | 6/2014 |
| CN | 105091236 | A | 11/2015 |
| CN | 105159079 | A | 12/2015 |
| CN | 105468145 | A | 4/2016 |
| CN | 205750334 | U * | 11/2016 |
| CN | 106178538 | A | 12/2016 |
| CN | 106959627 | A | 7/2017 |
| WO | 02/06966 | A1 | 1/2002 |

OTHER PUBLICATIONS

First Office Action dated Apr. 3, 2020 received in Chinese Patent Application No. CN 201710846785.8 together with an English language translation.

* cited by examiner

METHOD AND DEVICE FOR CONTROLLING TERMINAL, AND COMPUTER READABLE STORAGE MEDIUM

CROSS-REFERENCE TO RELATED APPLICATIONS

This application is a continuation of PCT International Application No. PCT/CN2017/104103, filed on Sep. 28, 2017, which claims priority to Chinese Patent Application No. 201710846785.8, filed on Sep. 18, 2017. The contents of PCT International Application No. PCT/CN2017/104103 and Chinese Patent Application No. 201710846785.8 are incorporated by reference herein. No new matter has been introduced.

TECHNICAL FIELD

The present disclosure relates to the technical field of smart home, and in particular, to a method and a device for controlling a terminal, and a computer readable storage medium.

BACKGROUND

With the rapid development of society, people receive new household concepts constantly. Smart home, as one of the development directions of modern homes, has attracted widespread attention. In recent years, voice recognition technology and gesture recognition technology have been widely used in smart home devices, due to their conveniences. For example, air conditioners can be adjusted through the voice recognition technology or gesture recognition technology. However, if multiple voice instructions and gesture instructions are received within a short time period, the settings may be incorrect due to instruction conflicts.

SUMMARY

An objective of the present disclosure is to provide a method and a device for controlling a terminal, and a computer readable storage medium, which aims that control instructions are received, and in response to a determination that there exists conflict among control instructions, the control instruction with the highest credibility is sent to the control terminal after the credibility of each control instructions is determined, thereby avoiding settings from conflicting.

In order to achieve the above objective, the present disclosure provides a method for controlling a terminal, including the following operations:

obtaining recognition results corresponding to control signals after receiving the control signals, and determining whether control instructions corresponding to the recognition results conflict, each control signal including at least one of a voice signal or a gesture signal;

determining a credibility of each control instruction in response to a determination that there exists conflict among control instructions; and sending the control instruction with highest credibility to a control terminal.

In some embodiments, the operation of "determining a credibility of each control instruction" includes:

comparing the control instruction corresponding to each recognition result with a pre-stored control instruction; and calculating a matching degree between the control instruction corresponding to each recognition result and the pre-stored control instruction, and determining the credibility of the control instruction according to the matching degree.

In some embodiments, the operation of "calculating a matching degree between the control instruction corresponding to each recognition result and the pre-stored control instruction" includes:

extracting a keyword of the control instruction corresponding to each recognition result; and calculating a coincidence degree between the keyword of the control instruction corresponding to each recognition result and a keyword of the pre-stored control instruction to obtain the matching degree between the control instruction corresponding to each recognition result and the pre-stored control instruction.

In some embodiments, the operation of "determining whether control instructions corresponding to the recognition results conflict" includes:

determining a terminal to be controlled corresponding to each recognition result;

obtaining an instruction set corresponding to the terminal to be controlled after the terminal to be controlled corresponding to the recognition result is consistent; and determining whether the control instruction corresponding to each recognition result matches a control instruction of the instruction set, when the control instruction of the instruction set matching the control instruction corresponding to each recognition result is not consistent, it is determined that the control instructions corresponding to the recognition results conflict.

In some embodiments, after the operation of "there exists conflict among control instructions", the method further includes:

outputting a prompt message of whether to resend the control instruction; and determining the credibility of each control instruction after no confirmation instruction is received within a preset time period.

In some embodiments, after the operation of "determining a credibility of each control instruction", the method further includes:

judging whether types of the control instructions are identical in response to a determination that the credibility of each control instruction is consistent; and sending the control instruction of a preset type to the control terminal in response to a determination that the types of the control instructions are different.

In some embodiments, after the operation of "sending the control instruction with highest credibility to a control terminal", the method further includes:

outputting a prompt message configured to skip responding to the control instruction.

In order to achieve the above objective, the present disclosure further provides a device for controlling a terminal, including a memory, a processor, a program for controlling the terminal stored on the memory and executable on the processor, the program, when executed by the processor, implements the operations of the method as described above.

In order to achieve the above objective, the present disclosure further provides a computer readable storage medium. The computer readable storage medium stores a program for controlling a terminal, the program, when executed by a processor, implements the operations of the method as described above.

The present disclosure provides a method and a device for controlling a terminal, and a computer readable storage medium. First, obtaining recognition results corresponding to control signals after receiving the control signals, and determining whether control instructions corresponding to the recognition results conflict, each control signal including at least one of a voice signal or a gesture signal; then determining a credibility of each control instruction in response to a determination that there exists conflict among control instructions; and sending the control instruction with highest credibility to a control terminal. As such, when control instructions are received and there exists conflict among control instructions, the control instruction with the highest credibility is sent to the control terminal after the credibility of each control instructions is determined, thereby avoiding settings from conflict.

The realization of the objective, functional characteristics, advantages of the present disclosure are further described with reference to the accompanying drawings.

DETAILED DESCRIPTION OF THE EMBODIMENTS

It should be understood that the specific embodiments described herein are only used to explain the present disclosure and are not intended to limit the present disclosure.

The present disclosure provides a method for controlling a device. When control instructions are received and the control instructions conflict, the control instruction with the highest credibility (or reliability) is sent to the terminal after the credibility of each control instructions is determined, thereby avoiding settings from conflicting.

Figure 1:
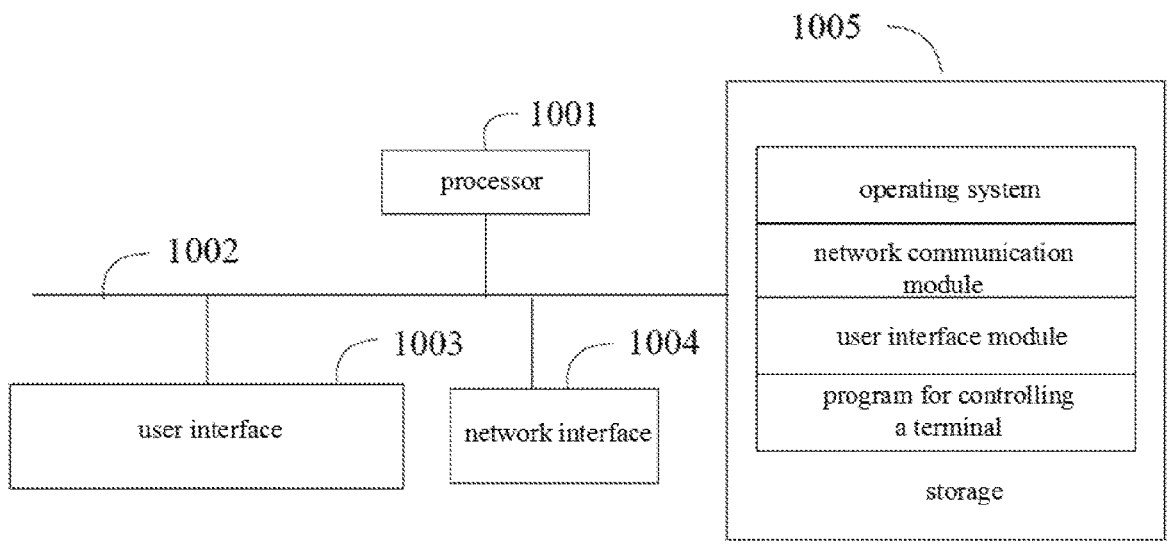
FIG. 1 is a schematic diagram of a hardware operating environment of a terminal according to an embodiment of the present disclosure.

As shown in FIG. 1, FIG. 1 is a schematic diagram of a hardware operating environment of a device according to an embodiment of the present disclosure.

The device according to an embodiment of the present disclosure may be a control center connected to a network or a server.

As shown in FIG. 1, the device may include a processor 1001, such as a CPU, a network interface 1004, a user interface 1003, a memory 1005, and a communication bus 1002. The communication bus 1002 is configured to implement communication between the above-described components. The user interface 1003 may include a display, an input unit such as a keyboard, a microphone, and a camera. The user interface 1003 may further include a standard wired interface and a wireless interface. The network interface 1004 may further include a standard wired interface and a wireless interface (such as a non-volatile memory), such as a disk memory. The memory 1005 may be a storage device independent of the processor 1001.

Those skilled in the art can understand that the structure of the device shown in FIG. 1 does not constitute a limitation on the device, and may include more or fewer components than shown, or a combination of some components, or a different component arrangement.

As shown in FIG. 1, the memory 1005 as a non-transitory computer storage medium may include an operating system, a network communication module, a user interface module, and a program for controlling the device.

In the device shown in FIG. 1, the network interface 1004 is mainly configured to connect to a background server and perform data communication with the background server. The user interface 1003 is mainly configured to connect to a client (user client) and perform data communication with the client. The processor 1001 may be configured to call the program for controlling the device stored on the memory 1005 and perform the following operations:

obtaining recognition results corresponding to control signals after receiving the control signals, and determining whether control instructions corresponding to the recognition results conflict, each control signal including at least one of a voice signal or a gesture signal;

determining a credibility of each control instruction in response to a determination that there exists conflict among control instructions; and sending the control instruction with highest credibility to a terminal.

Further, the processor 1001 may call the program for controlling the device stored on the memory 1005 and perform the following operations:

comparing the control instruction corresponding to the recognition result with a pre-stored control instruction; and calculating a matching degree between the control instruction corresponding to the recognition result and the pre-stored control instruction, and determining the credibility of the control instruction according to the matching degree.

Further, the processor 1001 may call the program for controlling the device stored on the memory 1005 and perform the following operations:

extracting a keyword of the control instruction corresponding to the recognition result; and calculating a coincidence degree between the keyword of the control instruction corresponding to the recognition result and a keyword of the pre-stored control instruction to obtain the matching degree between the control instruction corresponding to the recognition result and the pre-stored control instruction.

Further, the processor 1001 may call the program for controlling the device stored on the memory 1005 and perform the following operations:

determining a terminal to be controlled corresponding to each recognition result;

obtaining an instruction set corresponding to the terminal to be controlled after the terminal to be controlled corresponding to the recognition result is consistent; and determining whether the control instruction corresponding to each recognition result matches a control instruction of the instruction set, when the control instruction of the instruction set matching the control instruction corresponding to each recognition result is not consistent, it is determined that the control instructions corresponding to the recognition results conflict.

Figure 2:
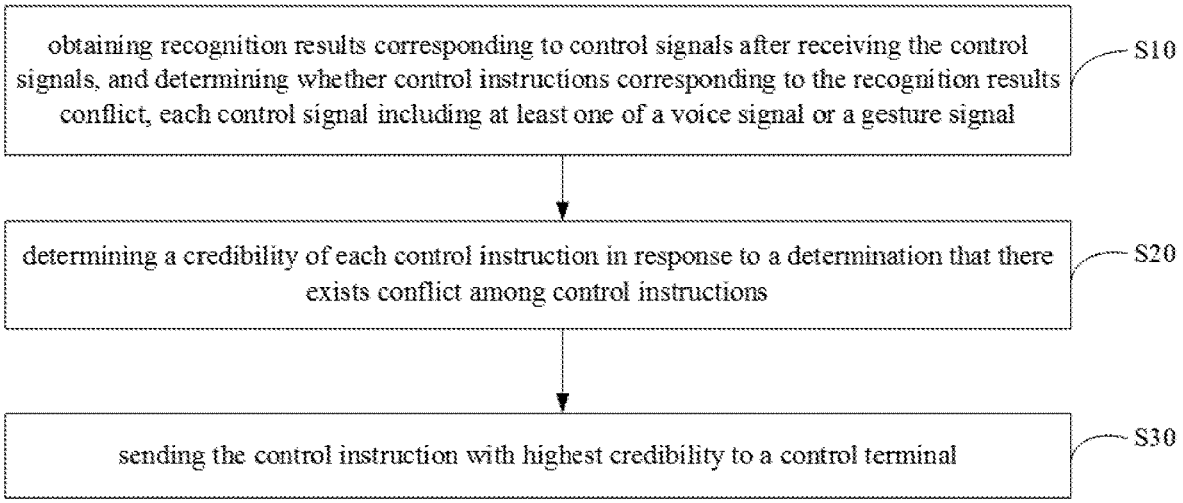
FIG. 2 is a schematic flowchart of a method for controlling a terminal according to a first embodiment of the present disclosure.

Referring to FIG. 2, in an embodiment, the method for controlling the terminal includes:

Operation S10, obtaining recognition results corresponding to control signals when receiving the control signals, and determining whether control instructions corresponding to the recognition results conflict, each control signal including at least one of a voice signal or a gesture signal.

In the present embodiment, when control signals are received within a preset time interval, it is determined that the control signals are received. The preset time interval may be, for example, one minute or thirty seconds. If a time interval between two control signals exceeds the preset time interval, the recognition results of the control signals are sequentially obtained, and the control instructions corresponding to the recognition results are sequentially sent to the terminal.

In the present embodiment, the received control signals may be a voice signal or a gesture signal, and may also be a voice signal and a gesture signal. When a voice signal is received, the voice signal is analyzed to obtain a voice recognition result. When a gesture signal is received, the gesture signal is analyzed to obtain a gesture recognition result, and then the terminal and the control instruction corresponding to the recognition result are obtained from the recognition result. Specially, keywords from the voice recognition result are extracted, and whether there is a terminal and a control instruction matching the keywords in the preset storage is determined. When there is a terminal and a control instruction matching the keyword in the preset storage, the terminal is controlled to respond to the control instruction. For example, when the user says "set the temperature of the air conditioner to 28° C.", the three words "air conditioner", "temperature", and "28° C." are keywords. The preset memory includes a voice storage module, and the voice storage module stores at least one preset voice keyword, and the preset voice keyword is a voice keyword and an instruction corresponding to the voice keyword. A voice comparison module compares the extracted voice keyword with the preset voice keyword one by one, and determines the terminal and the control instruction when the voice keyword matches the preset voice keyword. Similarly, the gesture graphics in the gesture recognition result are extracted, and the gesture comparison module compares the collected gesture graphic with the preset gesture graphic one by one, and determines the terminal and the control instruction when the gesture graphic matches the preset gesture graphic.

It should be noted that the control signal is not only a single voice signal or a single gesture signal, but can also be a combination of the voice signal and the gesture signal. For example, when the recognition control device is woken up, the user sends a voice signal of "temperature set to 28° C." and sends a gesture signal of "air conditioner." Then the terminal is "air conditioner" and the control instruction is "temperature set to 28° C."

It should be noted that the voice signal is collected, for example, by the microphone on the device, and the gesture signal is collected, for example, by the camera on the device.

Specifically, control instructions conflict when control instructions are received within a preset time interval, and these control instructions act on the same terminal, but the contents of the control instructions are inconsistent. Therefore, determining whether the control instructions conflict includes determining whether the terminals to be controlled corresponding to the control instructions are consistent. When the terminals to be controlled corresponding to the control instruction are consistent, determine whether the control instructions are consistent by matching the instructions set for the terminal to be controlled. When the control instructions are inconsistent, it is determined that the control instructions conflict. The preset time interval may be ten seconds, which is not specifically limited in the present disclosure. When the time interval between control instructions is greater than a preset time interval, the control instructions are sequentially executed in accordance with the order in which the control instructions are received.

Operation S20, determining a credibility of each control instruction in response to a determination that conflict among control instructions exists.

In the present embodiment, the credibility of the control instruction refers to the degree of matching between the received control instruction and the pre-stored control instruction. For example, if the user's Mandarin or gesture is not standard, there will be a deviation when matching the received control instruction with the pre-stored voice instruction or the pre-stored gesture instruction, so the reliability is low.

Operation S30, sending the control instruction with the highest credibility to a control terminal.

In the present embodiment, for example, if three control instructions are received within a preset time interval, by calculation, the credibility of a first control instruction is 80%, the credibility of a second control instruction is 20%, and the credibility of a third control instruction is zero. Then, the first control instruction with an 80% credibility is sent to the terminal.

In the present embodiment, first, when the control signals are received, the recognition results of the control signals are obtained, and it is determined whether the control instructions corresponding to the recognition results conflict. The control signal includes at least one of a voice signal or a gesture signal, then, when there exists conflict among the control instructions, the credibility of each control instruction is determined, and finally, the control instruction with the highest credibility is sent to the terminal. As such, when the control instructions are received and there exists conflict among control instructions, the control instruction with the highest credibility is sent to the terminal after the credibility of each control instructions is determined, thereby avoiding controlling the terminal with conflicting control instructions.

Figure 3:
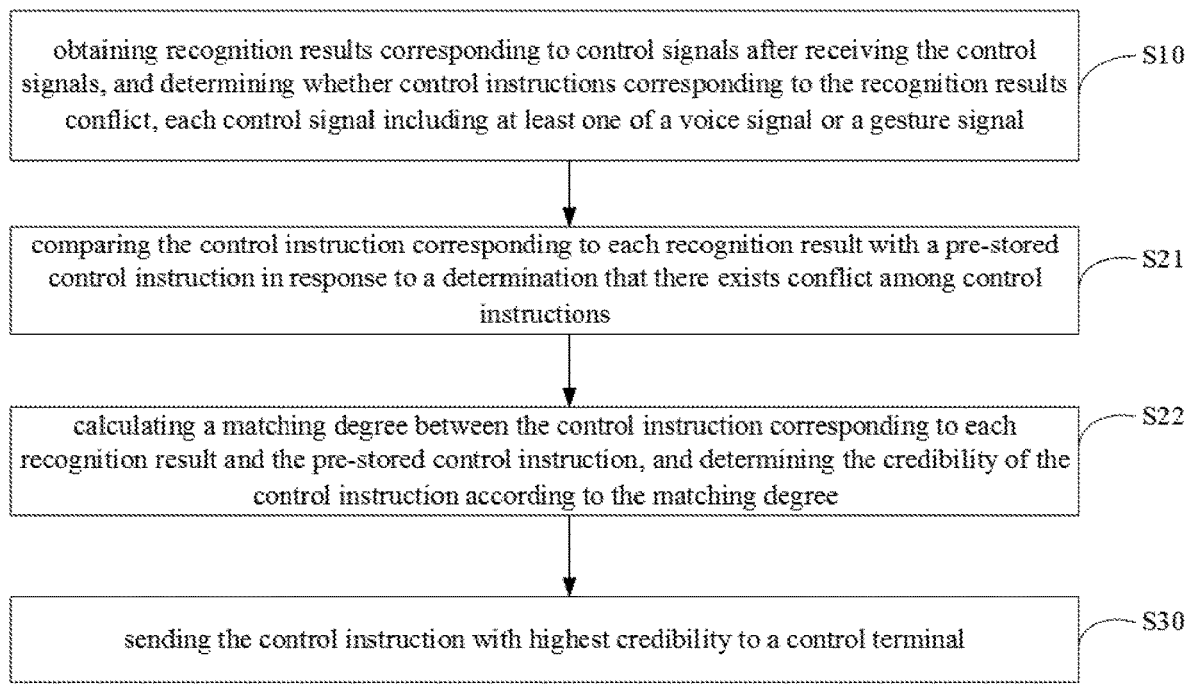
FIG. 3 is a detailed flowchart of the operation of "determining a credibility of each control instruction" in FIG. 2.

In an embodiment, as shown in FIG. 3, based on the embodiment shown in FIG. 2, the operation of "determining the credibility of each control instruction" includes:

Operation S21, comparing the control instruction corresponding to each recognition result with a pre-stored control instruction; and Operation S22, calculating a matching degree between the control instruction corresponding to each recognition result and the pre-stored control instruction, and determining the credibility of the control instruction according to the matching degree.

In the present embodiment, for example, the voice instruction or gesture instruction issued by the user is "turn on the air conditioner", but since the user's Mandarin or gesture is not standard, the recognition result is biased. Thus, when comparing with the pre-stored control instruction, the matching degree will be affected, and the credibility will also be affected.

In the present embodiment, first, a control instruction corresponding to the recognition result is compared with a pre-stored control instruction. Then, a matching degree between the control instruction corresponding to the recognition result and the pre-stored control instruction is calculated, and the credibility of the control instruction is determined according to the matching degree. As such, the credibility of the control instruction corresponding to the recognition result and the pre-stored control instruction is obtained by calculating the matching degree between the control instruction corresponding to the recognition result and the pre-stored control instruction, so as to determine the control instruction with the highest credibility.

Figure 4:
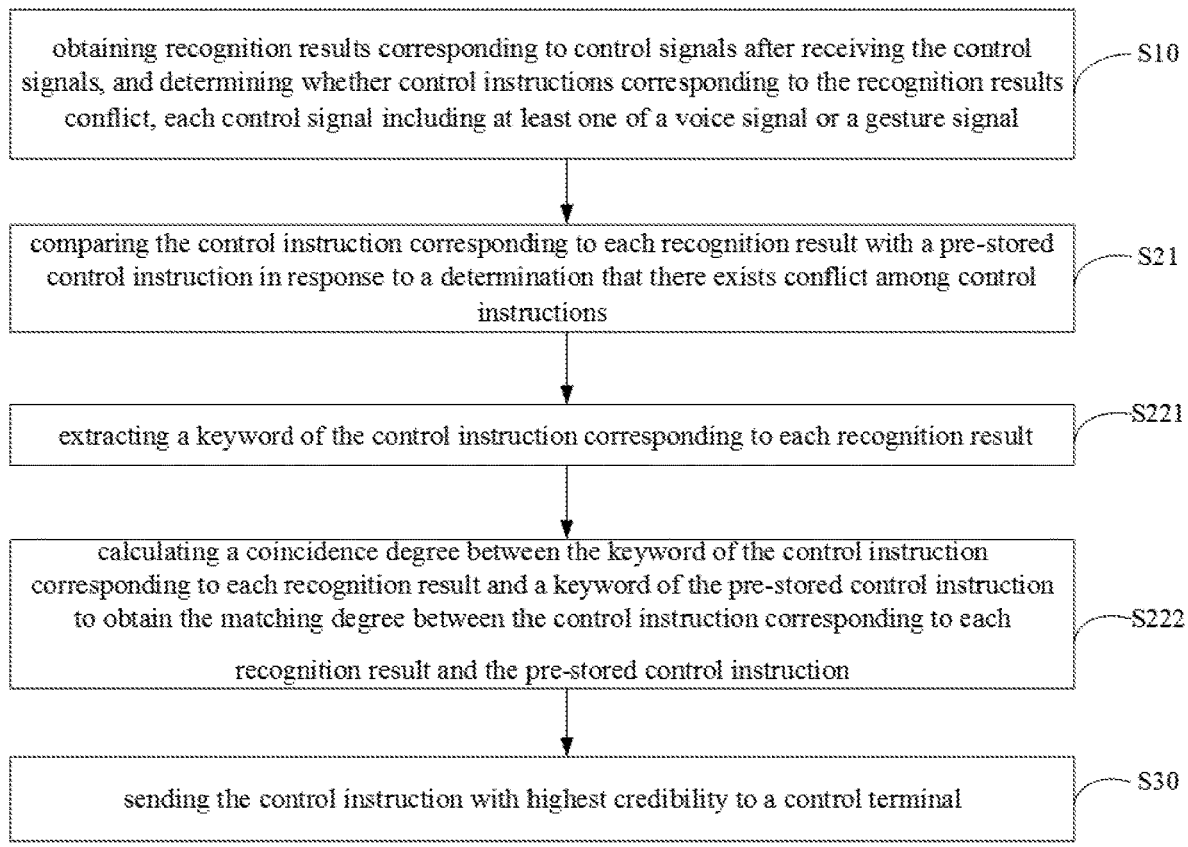
FIG. 4 is a detailed flowchart of the operation of "calculating a matching degree between the control instruction corresponding to each recognition result and the pre-stored control instruction" in FIG. 3.

In an embodiment, as shown in FIG. 4, based on the embodiment shown in any one of the foregoing FIG. 2 to FIG. 3, the operation of "calculating a matching degree between the control instruction corresponding to each recognition result and the pre-stored control instruction" includes:

Operation 5221, extracting a keyword of the control instruction corresponding to each recognition result; and Operation 5222, calculating a coincidence degree between the keyword of the control instruction corresponding to each recognition result and a keyword of the pre-stored control instruction to obtain the matching degree between the control instruction corresponding to each recognition result and the pre-stored control instruction.

In the present embodiment, for example, when the voice instruction or gesture instruction issued by the user is "set the air direction of the air conditioner to sweep left and right", the three words "air conditioner", "air direction", and "sweep left and right" are keywords. However, if the user's Mandarin or gesture is not standard, and when the user's Mandarin or gesture is matched with the keywords of the pre-store control instruction, there may be deviations in individual words in the voice recognition result or the gesture recognition result. For example, the word "air direction," if the recognition result is "air box", it will affect the matching degree between the control instruction corresponding to the recognition result and the pre-stored control instruction. Or, the keywords in the control instruction corresponding to the recognition result are similar in meaning to the pre-stored control instruction, such as "weaken" and "decrease", then it will also affect the matching degree between the control instruction corresponding to the recognition result and the pre-stored control instruction.

In the present embodiment, first, the keyword of the control instruction corresponding to the recognition result is extracted, and then the coincidence degree between the keyword of the control instruction corresponding to the recognition result and the keyword of the pre-stored control instruction is calculated, to obtain a matching degree between the control instruction corresponding to the recognition result and the pre-stored control instruction. As such, the coincidence degree between the keyword of the control instruction corresponding to the recognition result and the keyword of the pre-stored control instruction is calculated to obtain the matching degree of the control instruction corresponding to the recognition result and the pre-stored control instruction, so as to determine the control instruction with the highest matching degree.

Figure 5:
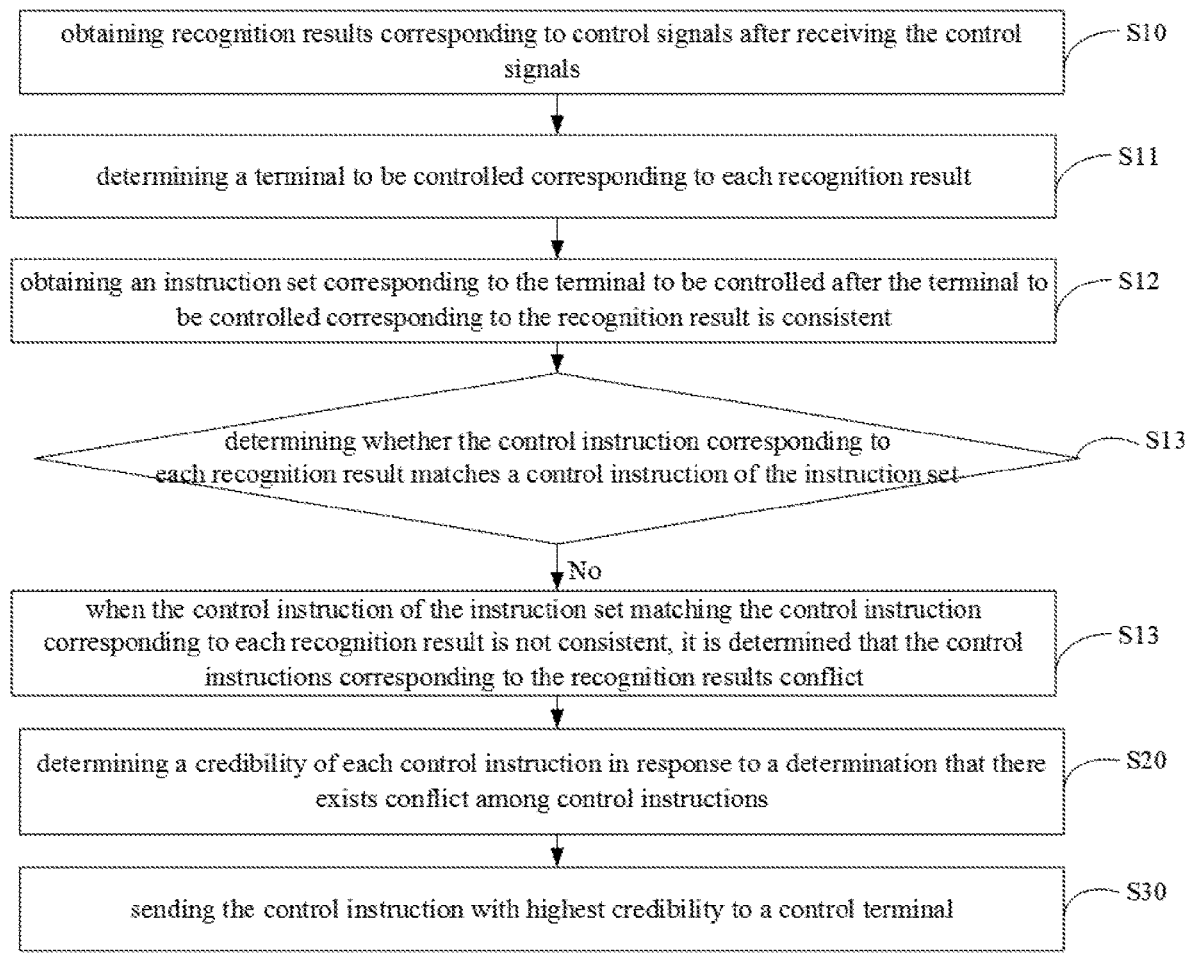
FIG. 5 is a detailed flowchart of the operation of "determining whether control instructions corresponding to the recognition results conflict" in FIG. 2.

In an embodiment, as shown in FIG. 5, based on the embodiment shown in any one of FIG. 2 to FIG. 4, the operation of determining whether control instructions corresponding to the recognition results conflict includes:

Operation S11, determining a terminal to be controlled corresponding to each recognition result;

Operation S12, when the terminal to be controlled corresponding to the recognition result is consistent, obtaining an instruction set corresponding to the terminal to be controlled; and Operation S13, determining whether the control instruction corresponding to each recognition result matches a control instruction of the instruction set, when the control instruction of the instruction set matching the control instruction corresponding to each recognition result is not consistent, it is determined that the control instructions corresponding to the recognition results conflict.

In the present embodiment, for example, a control instruction corresponding to a recognition result is "set the air direction of the air conditioner to sweep left and right", a control instruction corresponding to a recognition result is "set the temperature of the air conditioner to 28° C.", and since there is no way to execute it simultaneously, the two instructions conflict. Therefore, when determining whether the control instructions conflict, first determine whether the terminal to be controlled corresponding to the control instruction is consistent, after the terminal to be controlled corresponding to the control instruction is consistent, it is determined whether the control instructions are consistent by matching the instruction set of the terminal to be controlled, and when the control instruction is not consistent, it is determined that the control instructions conflict.

In the present embodiment, first, determining a terminal to be controlled corresponding to each recognition result; then after the terminal to be controlled corresponding to the recognition result is consistent, obtaining an instruction set corresponding to the terminal to be controlled; and determining whether the control instruction corresponding to each recognition result matches a control instruction of the instruction set, when the control instruction of the instruction set matching the control instruction corresponding to each recognition result is not consistent, it is determined that the control instructions corresponding to the recognition results conflict. As such, when determining the control instructions conflict, the control instruction with the highest credibility is sent to the terminal after the credibility of each control instructions is determined, thereby avoiding settings from conflicting.

Figure 6:
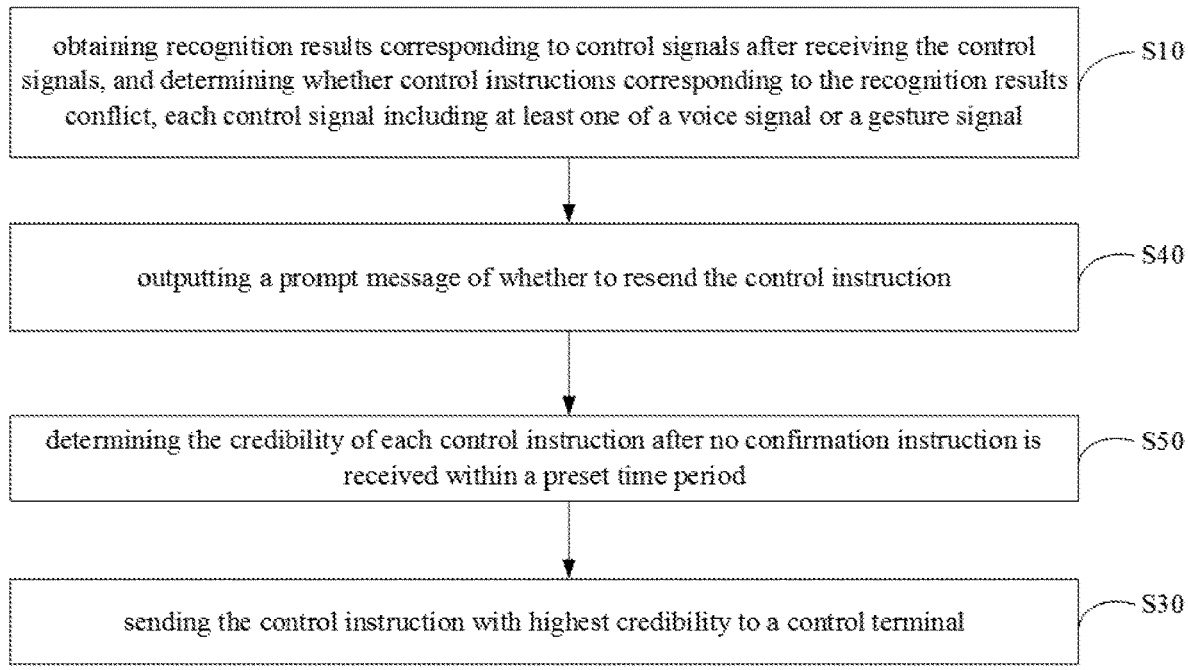
FIG. 6 is a schematic flowchart of a method for controlling a terminal according to a second embodiment of the present disclosure.

In an embodiment, as shown in FIG. 6, based on the embodiment as shown in any one of FIG. 2 to FIG. 5, after the operation of "when the control instructions corresponding to the recognition results conflict", the method further includes:

Operation S40, outputting a prompt message for resending the control instruction; and Operation S50, determining the credibility of each control instruction after no confirmation instruction is received within a preset time period.

In the present embodiment, after the control instructions corresponding to the recognition results conflict, a prompt message is output to inform the user of the instruction conflict, and ask the user to resend the instruction. When the user's confirmation instruction is not received within a preset time, the credibility of the control instruction is confirmed. It should be noted that the preset time may be five seconds or ten seconds, which is not specifically limited in the present disclosure. It should be noted that the method for outputting the prompt information may be voice or text, which is not specifically limited in the present disclosure.

In the present embodiment, first, outputting the prompt message for resending the instruction, and then, when the confirmation instruction is not received within a preset time, determining the credibility of the control instruction. As such, when the user's confirmation instruction is not received, the operation of determining the credibility of the control instruction is automatically executed, and the control instruction with the highest credibility is sent to the terminal, thereby avoiding settings from conflicting.

Figure 7:
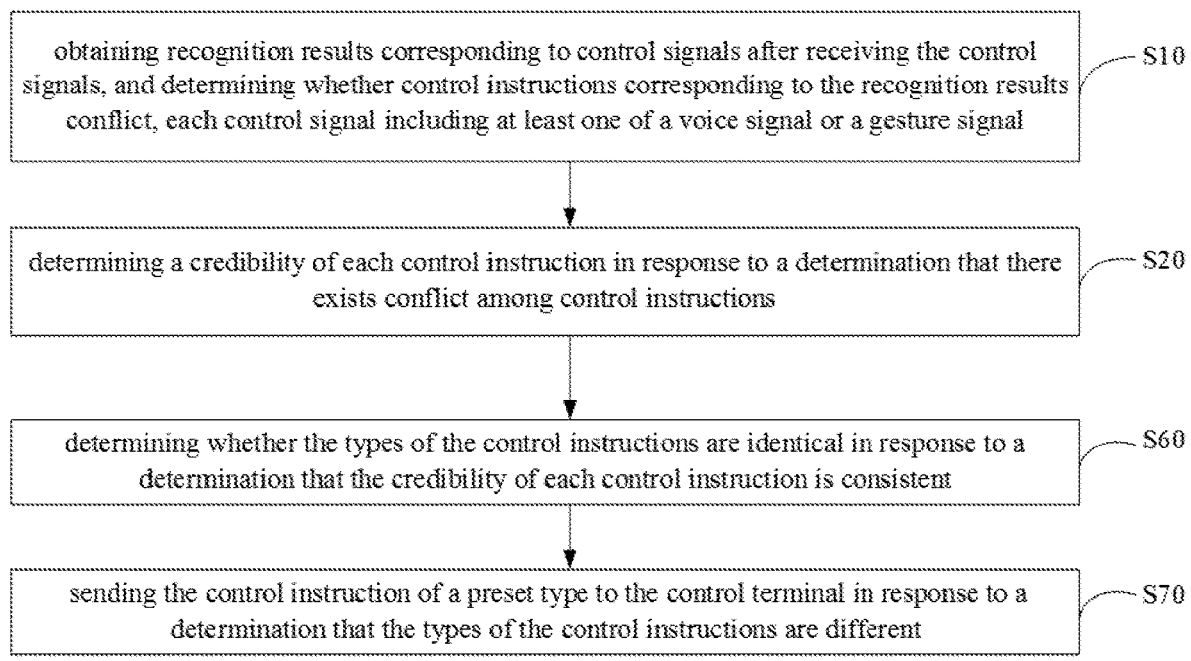
FIG. 7 is a schematic flowchart of a method for controlling a terminal according to a third embodiment of the present disclosure.

In an embodiment, as shown in FIG. 7, based on the embodiment as shown in any one of FIG. 2 to FIG. 6, after the operation of "determining a credibility of each control instruction", the method further includes:

Operation S60, determining whether the types of the control instructions are identical in response to a determination that the credibility of each control instruction is consistent; and Operation S70, sending the control instruction of a preset type to the control terminal in response to a determination that the types of the control instructions are different.

In the present embodiment, there is a certain error in both the voice signal and the gesture signal. For example, when the gesture is not standard, the gesture graphic recognized by the device may be wrong; or when the user's Mandarin is not standard, the keywords recognized by the device may also be wrong. When receiving the voice signal and the gesture signal, the default voice signal is more reliable. Therefore, when the credibility of the control instructions is the same, the control instruction corresponding to the voice recognition result is sent to the control terminal.

In the present embodiment, first, determining whether the types of the control instructions are identical when the credibility of the control instructions is consistent; and then, sending the control instruction with a preset type to the control terminal if the types of the control instructions are different. As such, the accuracy of instruction recognition is guaranteed.

Figure 8:
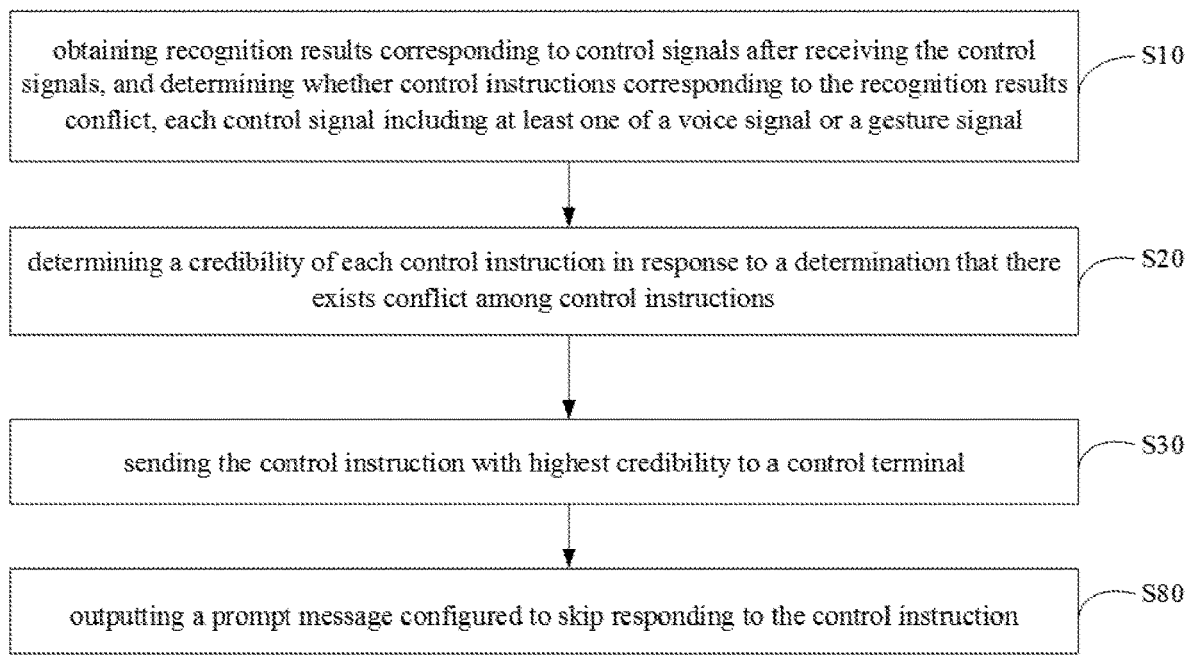
FIG. 8 is a schematic flowchart of a method for controlling a terminal according to a fourth embodiment of the present disclosure.

In an embodiment, as shown in FIG. 8, based on the embodiment as shown in any one of FIG. 2 to FIG. 7, after the operation of "sending the control instruction with highest credibility to a control terminal", the method further includes:

Operation S80, outputting a prompt message that the control instruction is not responded to.

In the present embodiment, after the control instruction with the highest credibility is sent to the terminal, a prompt message that does not respond to the control instruction is output to inform the user terminal of the instruction to be executed. It should be noted that the method for outputting the prompt information may be voice or text, which is not specifically limited in the present disclosure.

In the present embodiment, a prompt message that does not respond to the control instruction is output, so that the user terminal is notified of the instruction to be executed.

The present disclosure further provides a device for controlling a terminal, including a program for controlling the terminal. The program is configured to implement the following operations:

obtaining recognition results corresponding to control signals after receiving the control signals, and determining whether control instructions corresponding to the recognition results conflict, each control signal including at least one of a voice signal or a gesture signal;

determining a credibility of each control instruction in response to a determination that there exists conflict among control instructions; and sending the control instruction with highest credibility to a control terminal.

Further, the program is configured to implement the following operations:

comparing the control instruction corresponding to each recognition result with a pre-stored control instruction; and calculating a matching degree between the control instruction corresponding to each recognition result and the pre-stored control instruction, and determining the credibility of the control instruction according to the matching degree.

Further, the program is configured to implement the following operations:

extracting a keyword of the control instruction corresponding to each recognition result; and calculating a coincidence degree between the keyword of the control instruction corresponding to each recognition result and a keyword of the pre-stored control instruction to obtain the matching degree between the control instruction corresponding to each recognition result and the pre-stored control instruction.

Further, the program is configured to implement the following operations:

determining a terminal to be controlled corresponding to each recognition result;

obtaining an instruction set corresponding to the terminal to be controlled after the terminal to be controlled corresponding to the recognition result is consistent; and determining whether the control instruction corresponding to each recognition result matches a control instruction of the instruction set, when the control instruction of the instruction set matching the control instruction corresponding to each recognition result is not consistent, it is determined that the control instructions corresponding to the recognition results conflict.

Further, the program is configured to implement the following operations:

outputting a prompt message of whether to resend the control instruction; and determining the credibility of each control instruction after no confirmation instruction is received within a preset time period.

Further, the program is configured to implement the following operations:

determining whether the types of the control instructions are identical in response to a determination that the credibility of each control instruction is consistent; and sending the control instruction of a preset type to the control terminal in response to a determination that the types of the control instructions are different.

Further, the program is configured to implement the following operations:

outputting a prompt message configured to skip responding to the control instruction.

The present disclosure provides a device for controlling a terminal. First, obtaining recognition results corresponding to control signals after receiving the control signals, and determining whether control instructions corresponding to the recognition results conflict, each control signal including at least one of a voice signal or a gesture signal; then determining a credibility of each control instruction in response to a determination that there exists conflict among control instructions; and sending the control instruction with highest credibility to a control terminal. As such, when control instructions are received and the control instructions conflict, the control instruction with the highest credibility is sent to the control terminal after the credibility of each control instructions is determined, thereby avoiding settings from conflict.

The present disclosure further provides a computer readable storage medium. The computer readable storage medium stores a program for controlling a terminal, the program, when executed by a processor, implements the following operations:

obtaining recognition results corresponding to control signals after receiving the control signals, and determining whether control instructions corresponding to the recognition results conflict, each control signal including at least one of a voice signal or a gesture signal;

determining a credibility of each control instruction in response to a determination that there exists conflict among control instructions; and sending the control instruction with highest credibility to a control terminal.

Further, the program, when executed by a processor, implements the following operations:

comparing the control instruction corresponding to each recognition result with a pre-stored control instruction; and calculating a matching degree between the control instruction corresponding to each recognition result and the pre-stored control instruction, and determining the credibility of the control instruction according to the matching degree.

Further, the program, when executed by a processor, implements the following operations:

extracting a keyword of the control instruction corresponding to each recognition result; and calculating a coincidence degree between the keyword of the control instruction corresponding to each recognition result and a keyword of the pre-stored control instruction to obtain the matching degree between the control instruction corresponding to each recognition result and the pre-stored control instruction.

Further, the program, when executed by a processor, implements the following operations:

determining a terminal to be controlled corresponding to each recognition result;

obtaining an instruction set corresponding to the terminal to be controlled after the terminal to be controlled corresponding to the recognition result is consistent; and determining whether the control instruction corresponding to each recognition result matches a control instruction of the instruction set, when the control instruction of the instruction set matching the control instruction corresponding to each recognition result is not consistent, it is determined that the control instructions corresponding to the recognition results conflict.

Further, the program, when executed by a processor, implements the following operations:

outputting a prompt message of whether to resend the control instruction; and determining the credibility of each control instruction after no confirmation instruction is received within a preset time period.

Further, the program, when executed by a processor, implements the following operations:

determining whether the types of the control instructions are identical in response to a determination that the credibility of each control instruction is consistent; and sending the control instruction of a preset type to the control terminal in response to a determination that the types of the control instructions are different.

Further, the program, when executed by a processor, implements the following operations:

outputting a prompt message configured to skip responding to the control instruction.

The sequence numbers of the foregoing embodiments of the present disclosure are merely for description, and do not represent the superiority or inferiority of the embodiments.

Through the description of the above embodiments, those skilled in the art can clearly understand that the method in the foregoing embodiment can be implemented by means of software plus a necessary universal hardware platform, and of course it can also be implemented by hardware. Based on such an understanding, the technical solution of the present disclosure in essence or a part that contributes to the existing technology can be embodied in the form of a computer software product. The computer software product is stored in a storage medium (such as a ROM/RAM, a magnetic disk, and an optical disk) as described above, and includes several instructions for causing a terminal (such as a TV, a mobile phone, a computer, a server, an air conditioner, or a network equipment, etc.) to execute the methods described in the embodiments of the present disclosure.

The above are only preferred embodiments of the present disclosure, and thus do not limit the scope of the present disclosure. Any equivalent structure or equivalent process transformation made by using the description and drawings of the present disclosure is included in the scope of the present disclosure.

What is claimed is:

1. A method comprising:

obtaining recognition results corresponding to control signals, wherein each control signal of the control signals comprises at least one of a voice signal based on a voice detected and a gesture signal based on a gesture detected;

determining whether control instructions corresponding to the recognition results conflict;

in response to determining that the control instructions conflict, determining a credibility of each control instruction of the control instructions that conflict; and sending the control instruction with highest credibility among the determined credibilities of the control instructions to a terminal for controlling the terminal, wherein two or more control instructions conflict in response to:

the two or more control instructions being received within a preset time interval;

the two or more control instructions act on a same terminal; and contents of the two or more control instructions are inconsistent.

2. The method according to claim 1, wherein determining the credibility of the each control instruction of the control instructions comprises:

comparing the each control instruction of the control instructions with a pre-stored control instruction;

calculating a matching degree between the each control instruction of the control instructions and the pre-stored control instruction; and determining the credibility of the each control instruction of the control instructions according to the matching degree calculated.

3. The method according to claim 2,
wherein calculating the matching degree between the each control instruction of the control instructions and the pre-stored control instruction comprises:
extracting a keyword of the each control instruction of the control instructions; and
calculating a coincidence degree between the keyword of the each control instruction of the control instructions and a keyword of the pre-stored control instruction to obtain the matching degree between the each control instruction of the control instructions and the pre-stored control instruction.

4. The method according to claim 1,
wherein determining whether the control instructions corresponding to the recognition results conflict comprises:
determining a terminal-to-be-controlled corresponding to each recognition result of the recognition results;
determining whether the terminal-to-be-controlled corresponding to the each recognition result of the recognition results is the same;
in response to determining that the terminal-to-be-controlled corresponding to the each recognition result of the recognition results is consistent, obtaining an instruction set corresponding to the terminal-to-be-controlled;
determining whether the control instruction corresponding to the each recognition result matches a control instruction of the instruction set; and
in response to determining that the control instruction corresponding to the each recognition result does not match the control instruction of the instruction set, determining that the control instructions corresponding to the recognition results conflict.

5. The method according to claim 1, further comprising:
in response to determining that the control instructions conflict:
outputting a prompt message to resend the control signals;
determining whether the control signals were resent within a preset time period; and
in response to determining that the control signals were not resent within the preset time period, determining the credibility of the each control instruction of the control instructions.

6. The method according to claim 1, further comprising:
after determining the credibility of the each control instruction of the control instructions:
in response to determining that the credibility of the each control instruction of the control instructions are consistent, determining whether types of the control instructions are different; and
in response to determining that the types of the control instructions are different, sending the control instruction of a preset type of the types to the terminal.

7. The method according to claim 1, further comprising:
after sending the control instruction with highest credibility to the terminal, outputting a prompt message to skip responding to the control instruction.

8. A device comprising
a processor; and
a memory storing a program;
the processor being configured to execute the program to at least:
obtain recognition results corresponding to control signals, wherein each control signal of the control signals comprises at least one of a voice signal based on a voice detected and a gesture signal based on a gesture detected;
determine whether control instructions corresponding to the recognition results conflict;
in response to determining that the control instructions conflict, determine a credibility of each control instruction of the control instructions that conflict; and
send the control instruction with highest credibility among the determined credibilities of the control instructions to a terminal for controlling the terminal,
wherein two or more control instructions conflict in response to:
the two or more control instructions being received within a preset time interval;
the two or more control instructions act on a same terminal; and
contents of the two or more control instructions are inconsistent.

9. A non-transitory computer-readable storage medium storing a program that causes a processor to at least perform:
obtaining recognition results corresponding to control signals, wherein each control signal of the control signals comprises at least one of a voice signal based on a voice detected and a gesture signal based on a gesture detected;
determining whether control instructions corresponding to the recognition results conflict;
in response to determining that the control instructions conflict, determining a credibility of each control instruction of the control instructions that conflict; and
sending the control instruction with highest credibility among the determined credibilities of the control instructions to a terminal for controlling the terminal,
wherein two or more control instructions conflict in response to:
the two or more control instructions being received within a preset time interval;
the two or more control instructions act on a same terminal; and
contents of the two or more control instructions are inconsistent.

* * * * *